United States Patent
Chang

(10) Patent No.: US 7,446,964 B2
(45) Date of Patent: Nov. 4, 2008

(54) LENS MODULE AND CAMERA MODULE HAVING SAME

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/778,542

(22) Filed: Jul. 16, 2007

(65) Prior Publication Data

US 2008/0186600 A1    Aug. 7, 2008

(51) Int. Cl.
*G02B 7/02* (2006.01)

(52) U.S. Cl. ........................................ 359/824; 359/814

(58) Field of Classification Search ......... 359/694–701, 359/814, 819–824; 310/12; 396/75
See application file for complete search history.

(56) References Cited

U.S. PATENT DOCUMENTS

| 5,572,372 | A | * | 11/1996 | Sekine et al. | 359/824 |
| 5,587,846 | A | * | 12/1996 | Miyano et al. | 359/824 |
| 2007/0133973 | A1 | | 6/2007 | Nishikawa | 396/133 |

* cited by examiner

*Primary Examiner*—Mohammed Hasan

(57) ABSTRACT

A lens module includes: a holder having inner threads; a ring-shaped first support, the first support having outer threads and being threadedly engaged with a first portion of the inner threads of the holder; a ring-shaped second support, the second support having outer threads and being threadedly engaged with a second portion of the inner threads of the holder, at least one lens; a lens barrel, the lens barrel receiving the lens therein; a first magnetic field generator being attached to the lens barrel; and a second magnetic field generator being disposed on the second support. The first magnetic field generator together with the lens barrel is movable between the first and second supports under magnetic forces generated by the second magnetic field generator. A camera module using the lens module is also provided.

12 Claims, 4 Drawing Sheets

LENS MODULE AND CAMERA MODULE HAVING SAME

BACKGROUND

1. Technical Field

The present invention relates to lens modules, and particularly to a lens module with auto focus mechanism, and a camera module having the lens module.

2. Description of Related Art

With the ongoing development of microcircuitry and multimedia technology, camera modules, including, e.g., still camera modules and digital camera modules are now in widespread use and are being combined with various electronic devices. These camera modules need to be cheap and have excellent optical characteristics.

A camera module of the related art includes at least one lens module, and an image sensor module in alignment with the at least one lens module. The at least one lens module typically includes a lens barrel and lenses assembled in the lens barrel. Recently, lens modules have begun to integrate auto focus mechanisms, such as step motors for driving the lenses to move relative to the image sensor module, thereby achieving the auto focus function. However, the step motor is relatively bulky, and, in addition, the step motor consumes a substantial amount of power, especially relative to the amount of power that can be stored in a typical battery system of a camera or an electronic device.

What is needed, therefore, is a lens module which has a simple and energy-efficient auto focus mechanism.

What is also needed, is a camera module using the lens module.

SUMMARY

In a preferred embodiment, an exemplary lens module includes a hollow holder having an inner thread in an inner wall thereof, a ring-shaped first support having an outer thread, a ring-shaped second support having an outer thread, at least one lens, a lens barrel receiving the at least one lens therein, first and a second magnetic field generators and a control circuit. The first support is threadedly engaged with a first portion of the inner wall of the holder, the first support has a first end and an opposite second end. The second support is threadedly engaged with a second portion of the inner wall of the holder, the second support has a first end and an opposite second end, the first end of the second support facing toward the second end of the first support. The lens barrel is movable between the first support and the second support, the lens barrel has a first end and an opposite second end, the second end of the lens barrel facing toward the second support. The first magnetic field generator is attached to the second end of the lens barrel, and the second magnetic generator is disposed on the second end of the second support, the first and second magnetic field generators each being configured for generating first and second magnetic fields. The control circuit is configured (i.e., structured and arranged) for controlling at least one of the first and second magnetic field generators in a manner such that a direction of the first magnetic field is essentially the same as a direction of the second magnetic field. The first magnetic field generator together with the lens barrel is thus moved adjacent to the first support. A direction of the first magnetic field can alternatively be essentially opposite to the direction of the second magnetic field, in which case the first magnetic field generator together with the lens barrel is moved adjacent to the second support.

In another preferred embodiment, an exemplary camera module includes a hollow holder having an inner thread in an inner wall thereof, a ring-shaped first support having an outer thread, a ring-shaped second support having an outer thread, at least one lens, a lens barrel receiving the at least one lens therein, first and a second magnetic field generators, a control circuit and an image sensor. The first support is threadedly engaged with a first portion of the inner wall of the holder, the first support has a first end and an opposite second end. The second support is threadedly engaged with a second portion of the inner wall of the holder, the second support has a first end and an opposite second end, the first end of the second support facing toward the second end of the first support. The lens barrel is movable between the first support and the second support, the lens barrel has a first end and an opposite second end, the second end of the lens barrel facing toward the second support. The first magnetic field generator is attached to the second end of the lens barrel, and the second magnetic generator is disposed on the second end of the second support, the first and second magnetic field generators each being configured for generating first and second magnetic fields. The control circuit is configured (i.e., structured and arranged) for controlling at least one of the first and second magnetic field generators in a manner such that a direction of the first magnetic field is essentially the same as a direction of the second magnetic field. The first magnetic field generator together with the lens barrel is thus moved adjacent to the first support. A direction of the first magnetic field can alternatively be essentially opposite to the direction of the second magnetic field, in which case the first magnetic field generator together with the lens barrel is moved adjacent to the second support. The image sensor is configured for detecting light from the at least one lens.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module and camera module can be better understood with reference to the following drawings. The components in the drawing are not necessarily drawn to scale, the emphasis instead being placed upon clearly illustrating the principles of the present lens module and camera module. Moreover, in the drawings, like reference numerals designate corresponding parts throughout the several views.

DETAILED DESCRIPTION OF THE PREFERRED EMBODIMENTS

Embodiments of the present lens module and camera module will now be described in detail below and with reference to the drawings.

Figure 1:
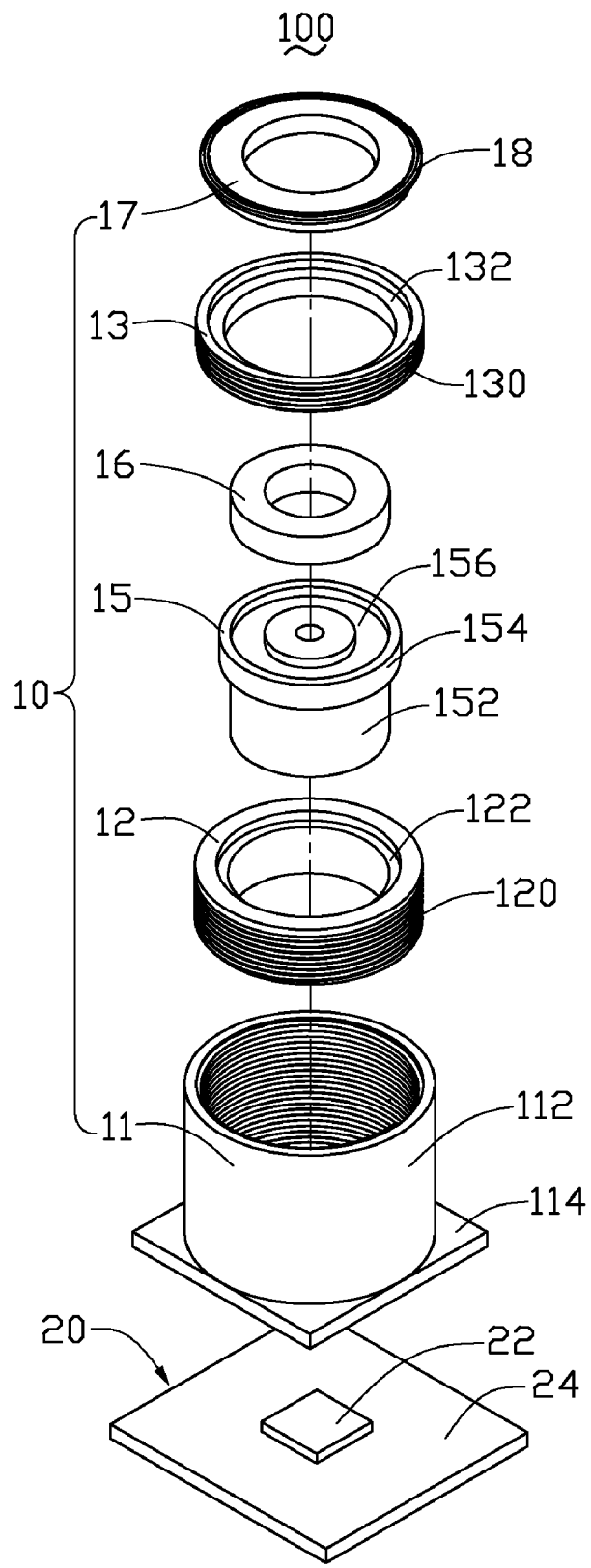
FIG. 1 is an exploded view of a camera module according to a preferred embodiment of the present invention.
Figure 2:
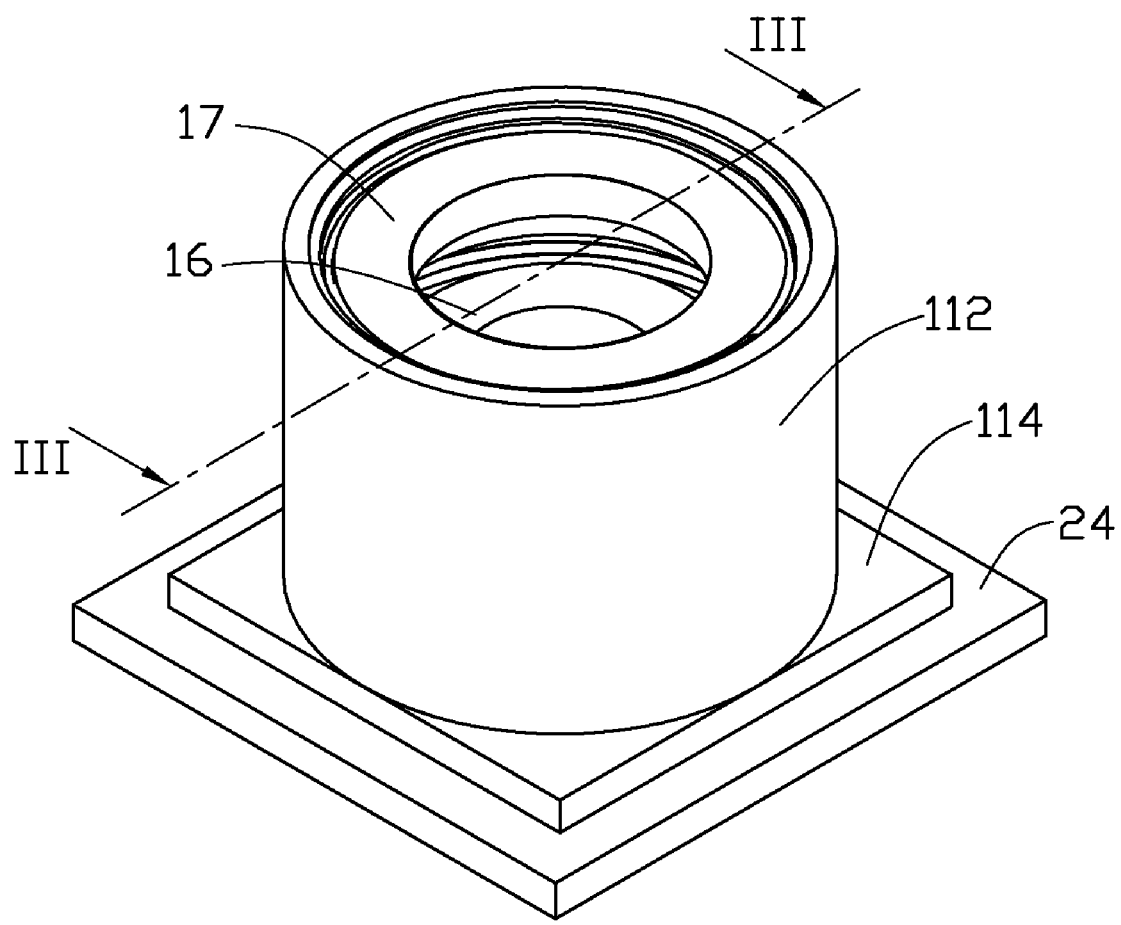
FIG. 2 is an assembled view of the camera module shown in FIG. 1.

Referring to FIGS. 1 and 2, an exemplary camera module 100 includes a lens module 10 and an image sensor module 20 in alignment with the lens module 10.

The lens module 10 includes a hollow holder 11, a ring-shaped first support 12, a ring-shaped second support 13, two lenses 14a, 14b, a lens barrel 15 receiving the two lenses 14a, 14b therein and disposed between the first and second support 12, 13, a first magnetic field generator 16, and a second magnetic field generator 17.

The holder 11 includes a cylinder portion 112 and a frame portion 114 in communication with the cylinder portion 112. The cylinder portion 112 of the holder 11 has an inner thread in an inner wall thereof.

The first support 12 and the second support 13 each have an outer thread 120, 130. The first support 12 is threadedly engaged in a first portion of the inner wall of the holder 11, and can be fixedly attached therein by gluing. The second support 13 is threadedly engaged in a second portion of the inner wall of the holder 11. A distance between the first support 12 and the second support 13 can be easily adjusted by rotating the second support 13. The first support 12 has an inner ring-shaped stepped structure 122 in an end thereof facing toward the second support 13. The second support 13 has an inner ring-shaped stepped structure 132 in an end thereof apart from the first support 12.

The two lenses 14a, 14b each can be made of plastic or glass, and in a spherical or aspherical shape. The lens barrel 15 includes a first end 152 and a second end 154, an external diameter of the second end 154 being larger than an external diameter of the first end 152. The lens barrel 15 has a ring-shaped recess 156 in the second end 154.

The first magnetic field generator 16 is a ring-shaped permanent magnet. The second magnetic field generator 17 is a ring-shaped iron core wrapped about with a control circuit wire 18. The first magnetic field generator 16 is engaged in the recess 156 of the lens barrel 15. The second magnetic field generator 17 is disposed on the stepped structure 132 of the second support 13.

The image sensor module 20 includes an image sensor 22 and a circuit board 24. The image sensor 22 is selected from a charge coupled device (CCD for short) or a complementary metal oxide semiconductor transistor (CMOS for short). The image sensor 22 is mounted on the circuit board 24, and is received in the frame portion 114 of the holder 11.

Figure 3:
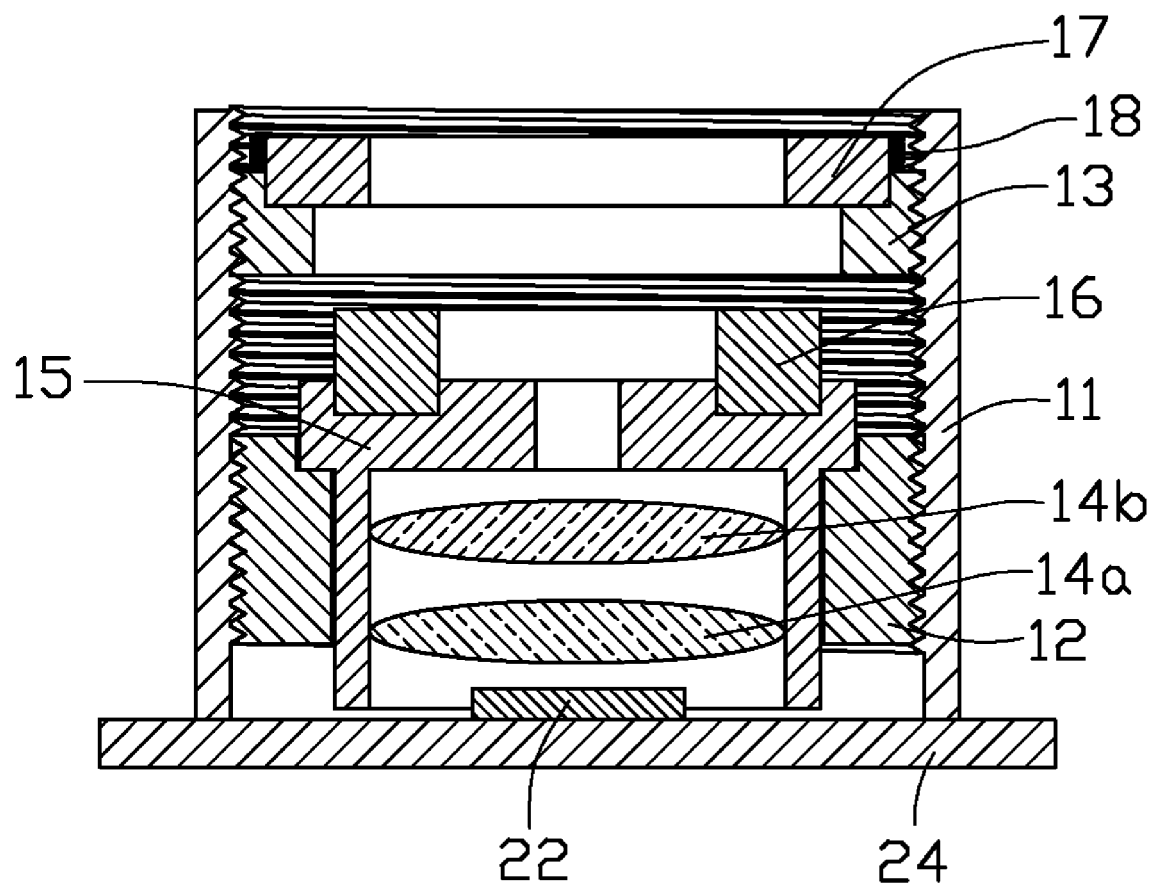
FIG. 3 is a cross-sectional view taken along line III-III of the camera module shown in FIG. 2.
Figure 4:
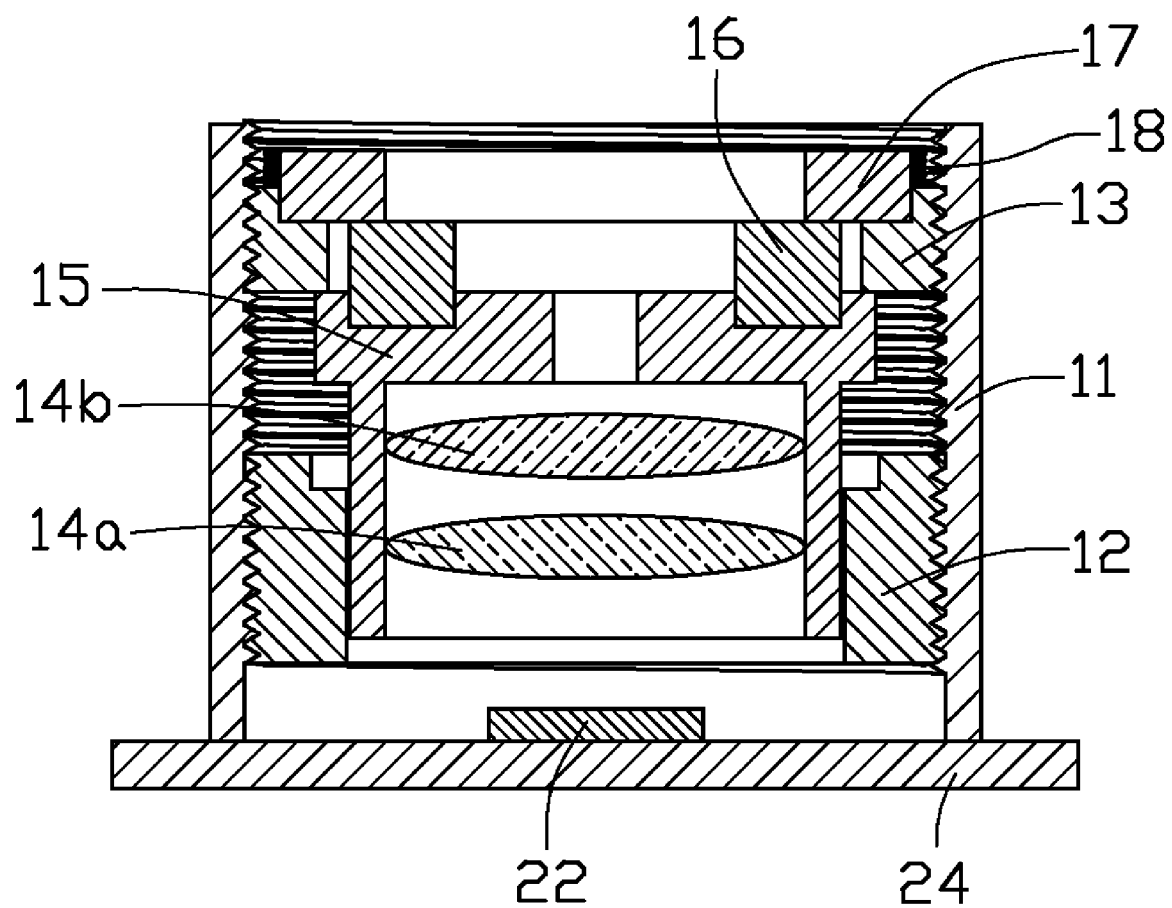
FIG. 4 is a schematic view of the first magnetic field generator together with the lens barrel being attracted to the position of the second support.

When a current is applied to the control circuit wire 18 on the second magnetic field generator 17, in a manner such that a direction of a magnetic field generated by the second magnetic field generator 17 is essentially the same as that of a magnetic field generated by the first magnetic field generator 16. The first magnetic field generator 16 together with the lens barrel 15 can thus be repelled adjacent to the first support 12 (see FIG. 3), and the second end 154 of the lens barrel 15 will lay over the stepped structure 122 of the first support 12. When a direction of a magnetic field generated by the second magnetic field generator 17 is alternatively opposite to that of a magnetic field generated by the first magnetic field generator 16, in this case the first magnetic field generator 16 together with the lens barrel 15 can be attracted adjacent to the second support 13 (see FIG. 4). In this way, the lens barrel 15 together with the lenses 14a, 14b are moved between the first and second supports 12, 13, and the lenses 14a, 14b thus can take images at the two positions.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
    a hollow holder having an inner thread in an inner wall thereof;
    a ring-shaped first support having an outer thread, the first support being threadedly engaged with a first portion of the inner wall of the holder, the first support having a first end and an opposite second end;
    a ring-shaped second support having an outer thread, the second support being threadedly engaged with a second portion of the inner wall of the holder, the second support having a first end and an opposite second end, the first end of the second support facing toward the second end of the first support;
    at least one lens;
    a lens barrel receiving the at least one lens therein, the lens barrel being movable between the first support and the second support, the lens barrel having a first end and an opposite second end, the second end of the lens barrel facing toward the second support;
    a first magnetic field generator for generating a first magnetic field at a region between the first support and the second support, the first magnetic field generator being attached to the second end of the lens barrel;
    a second magnetic field generator for generating a second magnetic field at the region between the first support and the second support, the second magnetic generator being disposed on the second end of the second support; and
    a control circuit for controlling at least one of the first and second magnetic field generator in a manner such that a direction of the first magnetic field is essentially the same as a direction of the second magnetic field, whereby the first magnetic field generator together with the lens barrel is moved adjacent to the first support, or a direction of the first magnetic field is essentially opposite to the direction of the second magnetic field, whereby the first magnetic field generator together with the lens barrel is moved adjacent to the second support.

2. The lens module as described in claim 1, wherein first support has an inner stepped structure therein, an external diameter of the second end of the lens barrel being larger than an external diameter of the first end of the lens barrel, and the second end of the lens barrel being supported by the inner stepped structure of the first support when the first magnetic field generator together with the lens barrel moves adjacent to the first support.

3. The lens module as described in claim 1, wherein the lens barrel has a recess in the second end thereof, the first magnetic field generator being engaged in the recess.

4. The lens module as described in claim 1, wherein the first magnetic field generator and the lens barrel are integrally formed together.

5. The lens module as described in claim 1, wherein the second support has an inner stepped structure therein, the second magnetic generator being disposed on the inner stepped structure.

6. The lens module as described in claim 1, wherein the control circuit is applied on the second magnetic field generator.

7. A camera module, comprising:
    a hollow holder having an inner thread in an inner wall thereof;
    a ring-shaped first support having an outer thread, the first support being threadedly engaged with a first portion of the inner wall of the holder, the first support having a first end and an opposite second end;

a ring-shaped second support having an outer thread, the second support being threadedly engaged with a second portion of the inner wall of the holder, the second support having a first end and an opposite second end, the first end of the second support facing toward the second end of the first support;

at least one lens;

a lens barrel receiving the at least one lens therein, the lens barrel being movable between the first support and the second support, the lens barrel having a first end and an opposite second end, the second end of the lens barrel facing toward the second support;

a first magnetic field generator for generating a first magnetic field at a region between the first support and the second support, the first magnetic field generator being attached to the second end of the lens barrel;

a second magnetic field generator for generating a second magnetic field at the region between the first support and the second support, the second magnetic generator being disposed on the second end of the second support;

a control circuit for controlling at least one of the first and second magnetic field generator in a manner such that a direction of the first magnetic field is essentially the same as a direction of the second magnetic field, whereby the first magnetic field generator together with the lens barrel is moved adjacent to the first support, or a direction of the first magnetic field is essentially opposite to the direction of the second magnetic field, whereby the first magnetic field generator together with the lens barrel is moved adjacent to the second support; and an image sensor for detecting light from the at least one lens.

8. The camera module as described in claim 7, wherein first support has an inner stepped structure therein, an external diameter of the second end of the lens barrel being larger than an external diameter of the first end of the lens barrel, and the second end of the lens barrel being supported by the inner stepped structure of the first support when the first magnetic field generator together with the lens barrel moves adjacent to the first support.

9. The camera module as described in claim 1, wherein the lens barrel has a recess in the second end thereof, the first magnetic field generator being engaged in the recess.

10. The camera module as described in claim 1, wherein the first magnetic field generator and the lens barrel are integrally formed together.

11. The camera module as described in claim 1, wherein the second support has an inner stepped structure therein, the second magnetic generator being disposed on the inner stepped structure.

12. The camera module as described in claim 1, wherein the control circuit is applied on the second magnetic field generator.

* * * * *